June 24, 1930. A. L. NELSON 1,766,449
PISTON
Original Filed May 23, 1925  2 Sheets-Sheet 1
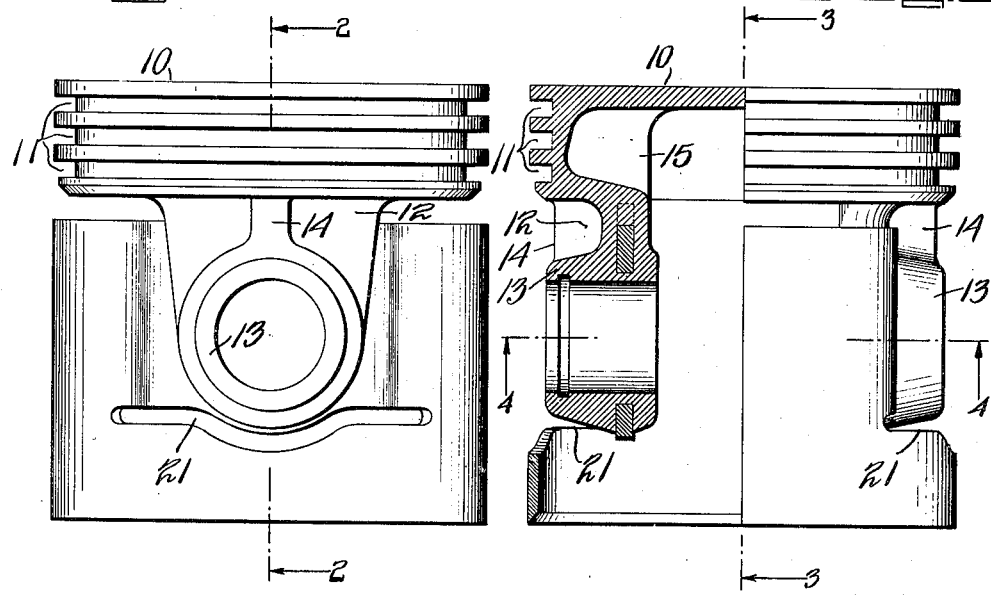
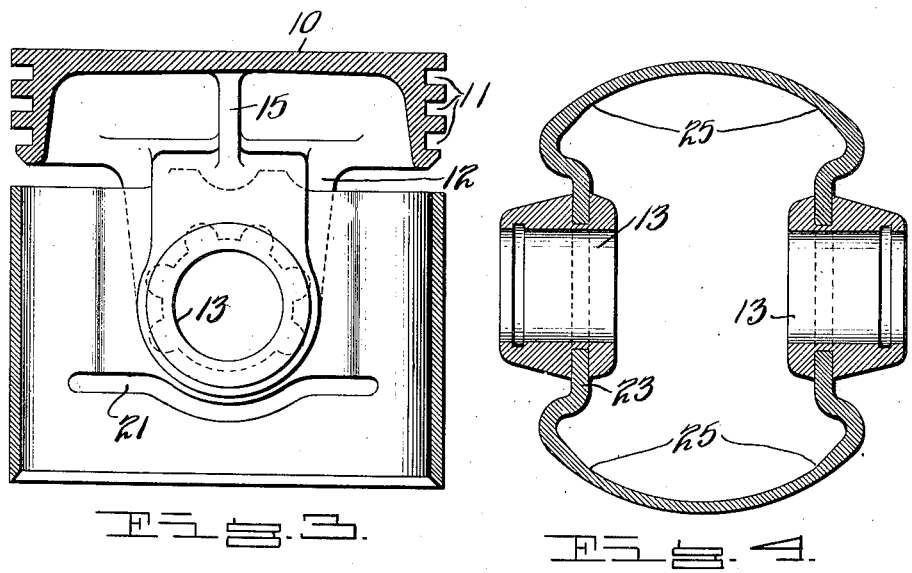
Inventor
Adolph L. Nelson
By Attorney

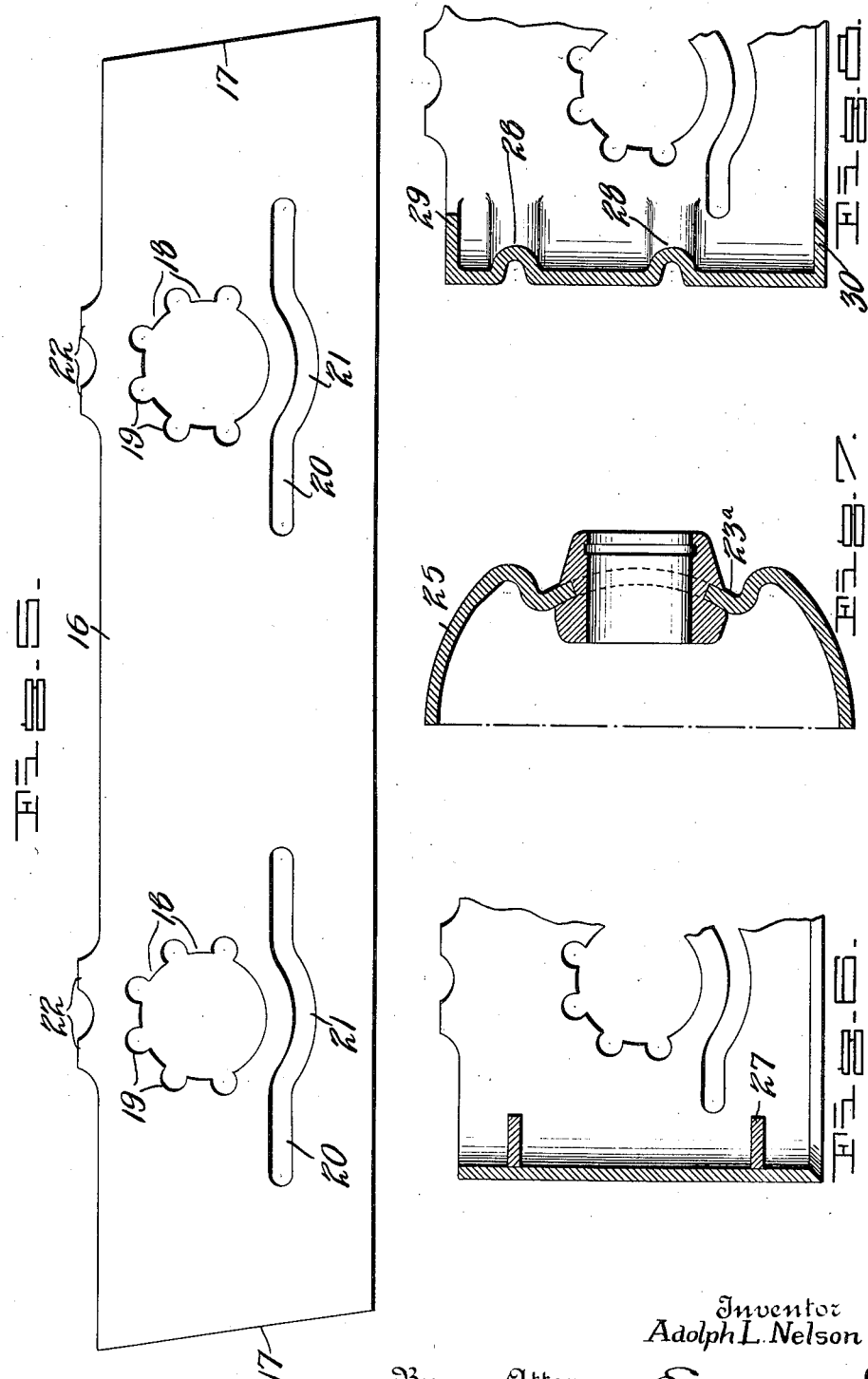

Patented June 24, 1930

1,766,449

UNITED STATES PATENT OFFICE

ADOLPH L. NELSON, OF DETROIT, MICHIGAN, ASSIGNOR TO BOHN ALUMINUM & BRASS CORPORATION, OF DETROIT, MICHIGAN

PISTON

Application filed May 23, 1925, Serial No. 32,478. Renewed September 14, 1929.

This invention relates to pistons of the trunk type and the principal objects of the invention are to provide a piston with a head of light weight having good thermal qualities and with a skirt having good wearing qualities, the skirt being constructed so as to be readily fitted with a small working clearance in the cylinder.

A further object is to provide a construction that is sufficiently rigid to avoid skirt deflection under thrust loads of the connecting rod so as to hold the head of the piston rigidly in relation to the cylinder bore hence the packing rings will lie dead in their grooves preventing groove wear.

In the drawings accompanying and forming part of this specification, certain practical and preferred embodiments of the invention are illustrated, but it should be understood that the structure may be modified in various respects without departure from the broad spirit and scope of the invention as hereinafter defined and claimed.

Figure 1 is a side elevation of one of the pistons.

Figure 2 is a side elevation taken from another angle and showing parts in section as on substantially the plane of line 2—2 of Figure 1.

Figure 3 is a vertical sectional view on substantially the plane of line 3—3 of Figure 2.

Figure 4 is a horizontal sectional view on substantially the plane of line 4—4 of Figure 2.

Figure 5 is a development of the skirt section of the piston.

Figures 6, 7 and 8 are fragmentary sectional views illustrative of modifications of the skirt structure.

The head section of the piston is designated 10 and is shown made in the form of a hollow casting having a dependent portion provided with the piston ring grooves 11 and with integral lugs or bosses 12 extended downwardly therefrom said lugs embodying piston pin bearings 13. The lugs 12 are shown formed as inwardly directed webs each braced at the outside by a strut 14 extending from the lower end of the piston ring section to the piston pin bearing and braced at the inside by an integral strut 15 extending from the head downwardly to the shelf of the inwardly projecting web, Figure 2. This construction gives the effect of a column extending from the head down to the bearing having a width substantially equal to the full length of the bearing, giving the desired strength, without sacrificing light weight.

Usually the head section carrying the ring grooves and the pin bearings is cast in aluminum alloy or other suitable metal and to provide the desired wearing and cylinder fitting qualities, the skirt is usually made of iron or steel. In the present disclosure the skirt is illustrated in Figure 5 as made up of a strip 16 of sheet metal having parallel angled ends 17 which when the sheet is rolled into cylindrical form, abut on a diagonal line and are integrally secured as by suitable welding. In some cases it is desirable not to weld the joint but only to make the ends come within a short distance of each other leaving a slit in the skirt.

This skirt strip is also shown as blanked out with openings 18 for the piston pin bearings notched at 19 for interlocking with the cast metal and with longitudinal slots 20 downwardly arched at 21 beneath the openings 18. It will be understood that the slots are intended to facilitate the bending of the skirt into forms such as shown in Figures 2, 4 and 9. Spaced lugs 22 on the upper edge of the strip are shown for increasing the interlock between the solid and cast metals and for carrying a part of the thrust load from the piston head.

In forming up the skirt body the sections of the strip above the slots 20 are flattened and offset inwardly to form bridges 23 about which the metal of the dependent lugs is flowed. Instead of being straight and flat as in Figure 4, these bridge sections forming the connections between skirt and wrist pin bearings may be arched or grooved as shown at 23ª in Figure 7. Light weight is obtained for the skirt by thinning that part of the wall which extends between the bridge portions, as indicated at 25 in Figures 4 and 7.

In Figure 6 I have shown how the interior of the skirt may be further braced against thrust forces above and below the piston pin bearings by special flat reinforcing cross ribs 26 and 27 secured by welding or otherwise to the inner wall of the skirt.

In Figure 8 a somewhat similar effect is obtained by indenting the sides of the skirt body to provide cross ribs 28 at the sides of and substantially parallel to the piston pin bearings and inturned flanges 29 and 30 at the upper and lower ends of the skirt body.

The piston of the present invention can be produced simply and inexpensively in a light strong structure and the much-sought-after wearing and heat conducting qualities are both attained by the combination of the hard metal skirt and the light weight head.

The skirt may be made of material having a coefficient of expansion closely approaching that of the surrounding cylinder wall, rendering it unnecessary to provide extra clearance as in former constructions where the piston body is all of metal having a higher coefficient of expansion than the cylinder; hence the piston can be made to fit closely in the cylinder with consequent elimination of any possibility of piston slap.

The piston skirt can obviously be formed in several ways different from that illustrated and described. As a case in point, the skirt can easily be formed from a cylindrical tube. Another simple method is to make the skirt in two halves and weld them together as on line 3—3 of Figure 2.

When the skirt is made of steel the wearing surface may be carbonized and hardened or it may be carbonized and left soft. Both methods give a good wearing skirt when used in a cast iron cylinder.

This application is in some respects a continuation of my pending application 643,499.

What is claimed is:

1. A piston comprising a cast metal head and a pre-formed skirt slotted circumferentially in opposite sides of the same and having the metal above the slots indented inwardly and perforated, dependent lugs at opposite sides of the head cast about the indented portions of the skirt, and piston pin bearings in said lugs extending through the perforations referred to the edges of the skirt about said perforation being buried in said lugs, substantially as set forth.

2. A piston comprising a skirt of wearing material and a head of lighter cast material, dependent piston pin lugs on said head cast about portions of the skirt, said portions being of greater thickness than parts of the skirt between the wrist pin bearings to thereby render said first portions substantially rigid with connected intermediate portions relatively lighter in weight, substantially as set forth.

3. As an article of manufacture, a blank for a piston skirt comprising a strip of sheet metal having piston pin openings therethrough with longitudinal slots below the same to enable displacement of those portions of the strip having the piston pin openings therein, said strip having projections at the edge above the piston pin openings and said openings being notched to effect interlocking engagement with metal for a piston head cast thereabout, substantially as set forth.

4. In a piston, a piston head, a skirt, struts integral with the skirt said skirt otherwise being independent of the piston head, and piston pin bosses integral with the head said bosses being cast about portions of the struts, substantially as set forth.

5. A method of making pistons by forming a narrow rhomboid of sheet metal with spaced apertures, rolling it into cylindrical form, welding the meeting edges on a diagonal line, flattening the sides about the apertures, and securing thereon a head and piston pin bosses, substantially as set forth.

6. A piston having a skirt, piston pin bearings carried by the skirt, and separate transverse reinforcing ribs secured to the skirt, substantially as set forth.

7. As an article of manufacture, a blank for a piston skirt comprising a strip of sheet metal having piston pin openings of irregular shape therethrough with longitudinal slots below the same to enable displacement of those portions of the strip having the piston pin openings therein, substantially as set forth.

8. A piston having a skirt with flattened sides, a head cast on the skirt, piston pin bosses integral and homogeneous with the head providing bearings passing through holes in the skirt, and irregular margins about said holes engaging the piston pin bosses, substantially as set forth.

9. A piston having a skirt with flattened sides, a head cast on the skirt, and piston pin bosses integral with the head providing bearings passing through holes in the skirt the head being separate from the skirt between said bosses and the top rim of the skirt being irregular opposite said bosses, substantially as set forth.

10. A method of making pistons by forming a skirt having pin receiving portions and wall-bearing portions, and casting a head about said pin receiving portions, leaving an air gap between said head and said wall-bearing portions, substantially as set forth.

11. A piston having a skirt, the upper edge of the skirt being formed inwardly from the normal skirt diameter at opposite sides, a head formed of cast material, integral homogeneous piers depending from the head and securing the skirt to the head, each pier embracing the upper edge of the skirt at one of the inwardly-formed portions.

12. A piston having a skirt, the upper edge of the skirt being formed inwardly from the normal skirt diameter at opposite sides, a head formed of cast material, integral homogeneous piers depending from the head and securing the skirt to the head, each pier embracing the upper edge of the skirt at one of the inwardly-formed portions, the skirt portions intermediate the piers constituting cylinder-bearing portions, the upper end of the cylinder-bearing portions being separated from the head so that the head, in expanding, will not carry the cylinder-bearing portions outwardly.

13. A piston having a skirt formed of sheet material, the upper edge of the skirt being dented inwardly from the normal skirt diameter at opposite sides, a head formed of cast material, integral homogeneous piers depending from the head and securing the skirt to the head, each pier embracing the upper edge of one of the indented portions.

14. A piston having a skirt formed of sheet material, the upper edge of the skirt being dented inwardly from the normal skirt diameter at opposite sides, a head formed of cast material, integral homogeneous piers depending from the head and securing the skirt to the head, each pier embracing the upper edge of one of the indented portions, the skirt portions intermediate the piers constituting cylinder-bearing portions, the upper end of the cylinder-bearing portions being separated from the head so that the head, in expanding, will not carry the cylinder-bearing portions outwardly.

15. A piston having a skirt formed of sheet material, the upper edge of the skirt being dented inwardly on opposite sides, the indented portions having apertures formed therein, a head formed of cast material, integral homogeneous piers depending from the head and securing the skirt to the head, the material of each pier embracing one of the indented portions and passing through the aperture therein.

16. A piston having a skirt formed of sheet material the upper edge of the skirt being dented inwardly on opposite sides, the indented portions having apertures formed therein, a head formed of cast material, integral homogeneous piers depending from the head and securing the skirt to the head, the material of each pier surrounding the upper edge of one of the indented portions and passing through the aperture therein, the skirt portions intermediate the piers constituting cylinder-bearing portions, the upper end of the cylinder-bearing portions being separated from the head so that the head, in expanding, will not carry the cylinder-bearing portions outwardly.

17. A piston comprising a skirt formed of sheet material and having cylinder-bearing portions, parts of the skirt between the cylinder-bearing portions being bent inwardly from the normal circumference of the skirt, the inwardly bent portions being provided with openings with irregular margins, a piston head of cast material, integral homogeneous piers depending from the head carrying piston pin bosses engaged in the said openings in the skirt.

18. A piston comprising a skirt formed of sheet material and having cylinder-bearing portions, parts of the skirt between the cylinder-bearing portions being bent inwardly from the normal circumference of the skirt, the inwardly bent portions being provided with openings having irregular margins, a piston head of cast material, integral homogeneous piers depending from the head carrying piston pin bosses engaged in the said openings in the skirt, the upper ends of the cylinder-bearing portions being separated from the head, so that the head, in expanding, will not carry the cylinder-bearing portions outwardly.

In witness whereof, I have hereunto set my hand at Detroit, Michigan, this 19th day of May, A. D. nineteen hundred and twenty-five.

ADOLPH L. NELSON.